United States Patent [19]
Ito et al.

[11] Patent Number: 5,212,632
[45] Date of Patent: May 18, 1993

[54] ADAPTIVE CONTROL SYSTEM

[75] Inventors: Osamu Ito, Kadoma; Shigeaki Matsubayashi, Sakai, both of Japan

[73] Assignee: Matsushita Electric Industrial Co., Ltd., Kadoma, Japan

[21] Appl. No.: 643,589

[22] Filed: Jan. 22, 1991

[30] Foreign Application Priority Data

Jan. 22, 1990 [JP] Japan ................................. 2-13141
Jul. 20, 1990 [JP] Japan ................................. 1-193638

[51] Int. Cl.$^5$ ........................ G05B 13/02; G06F 15/46
[52] U.S. Cl. .................................. 364/151; 364/149; 364/164; 364/165
[58] Field of Search .............................. 364/148-152, 364/164, 165, 160-163

[56] References Cited

U.S. PATENT DOCUMENTS

| | | | |
|---|---|---|---|
| 3,920,965 | 11/1975 | Sohrwardy | 364/149 |
| 3,934,124 | 1/1976 | Gabriel | 364/165 |
| 4,639,853 | 1/1987 | Rake et al. | 364/149 |
| 4,825,055 | 4/1989 | Pollock | 364/164 |

FOREIGN PATENT DOCUMENTS 0128491 12/1984 European Pat. Off. .

OTHER PUBLICATIONS

Kaoru Nakano; "Science In A Living Body" vol. 37, No. 1, pp. 41-48, 1986.
N. Wagner et al., "A Knowledge Based Control Strategy For A Biped", pp. 1520-1524 Proceedings 1988 IEEE International Conference of Robotics and Automation, vol. 3, Apr. 1988.

Primary Examiner—Jerry Smith
Assistant Examiner—Thomas E. Brown
Attorney, Agent, or Firm—Cushman, Darby & Cushman

[57] ABSTRACT

In an adaptive control system, an input of an object to be controlled is varied by a small value, and a resultant output is detected. The small value is changed on the basis of the difference between the output and an aimed value, and trials are repeated. The small value is determined on the basis of a qualitative model which is composed of a boundary function including the input and boundary parameters of the object. If the trend in the difference between the output and the aimed value is to make it larger, the qualitative model is changed so that the trend is to make it smaller.

4 Claims, 6 Drawing Sheets

ADAPTIVE CONTROL SYSTEM

FIELD OF THE INVENTION AND RELATED ART STATEMENT

1. Field of the Invention

The present invention relates generally to a control system, and more particularly, to an adaptive control system for controlling the system in which relation between input data and output data is automatically selected from a plurality of data so as to realize the most preferable operation in a walking robot, a chemical plant or the like.

2. Description of the Prior Art

An adaptive control system in the prior art is disclosed in the paper titled "Self-acting machine" (Science in a Living Body, Volume 37, Number 1, pages 41–48, 1986 written by Kaoru NAKANO). In the paper, adaptive control for a walking robot shown in FIG. 1 is described. The walking robot has a foreleg 102F and a hind leg 102H. The foreleg 102F and the hind leg 102H are pivotally mounted on a body 100 of the walking robot and are driven by motors 103F and 103H, respectively. The walking robot is further provided with an output sensor 106 for measuring a travel distance thereof. The revolution of the motors 103F and 103H are controlled by a driving circuit 104.

In general, the operation of the walking robot is given by $$y = g(U) \qquad (1),$$

where, y: a travel distance of the walking robot, which is an output of the control system, U: an angular input vector of the foreleg 102F and hind leg 102H, which is an input vector represented by components of (u1A, u1B, u2A, u2B), and g: a function which cannot be decided in original stage.

According to the adaptive control system of the prior art, in order to determine an angular input vector U which results in a maximum travel distance y, a "hill climbing method" well known to those having skill in the art is applied thereto. The hill climbing method comprises the following three steps:

Step 1: Eighty-one input-variation-vectors $\Delta U1, \Delta U2, \ldots, \Delta U81$ which have various small values are set. The input-variation-vectors $\Delta Ui$ are represented by $(\Delta u1A, 0, 0, 0)$ or $(0, -\Delta u1B, \Delta u2A, \Delta u2B)$, for example. The number of the input-variation-vectors $\Delta Ui$ are given by ($3^4$) in the above-mentioned case in a manner which is familiar to one skilled in the art. The numeral "3" represents the number of signs "+", "−" and "0", and the exponent "4" of the power is equal to the number of the components of the input-variation-vector $\Delta Ui$.

Step 2: One input-variation-vector $\Delta Ui$ of the above-mentioned input-variation-vectors $\Delta U1, \Delta U2, \ldots, \Delta U81$ is added in turn to the present input vector U from the input-variation-vector $\Delta U1$ to the input-variation-vector $\Delta U81$. The input vector $Ui(U+\Delta Ui)$ including the input-variation-vector $\Delta Ui$ is inputted to the driver 104 of the walking robot. Then an output variation $\Delta yi$ is detected with respect to each input vector Ui.

Step 3: In order to determine the input-variation-vector $\Delta Uj$ which makes the output variation $\Delta yj$ a maximum, the present input vector U is replaced with other input vector $Ui(U+\Delta Ui)$.

The above-mentioned steps 2 and 3 are repeated, and when the values of variations of the entire output are "−" or "0", the present input vector U is determined to be a desirable input vector. Thus, the above-mentioned process is completed.

The above-mentioned adaptive control system in the prior art is not only applied to the walking robot but also is applicable to a system in which control characteristic can not be known in advance. According to the adaptive control system, however, eighty-one trials are required in the step 2. It is now assumed that ten times of repetition are required in these steps 2 and 3 in order to determine the maximum value of the output "y", and a large number of trials for example eight hundred trials must be repeated, which are troublesome in actual application.

OBJECT AND SUMMARY OF THE INVENTION

An object of the present invention is to provide an adaptive control system for determining a preferable relation between input data and output data by relatively small number of trial.

The adaptive control system in accordance with the present invention comprises:

input-variation-vector generating means for generating a plurality of input-variation-vectors for varying input applied to an object to be controlled, qualitative model calculation means for outputting predictive sign data by applying calculation to said input-variation-vector on the basis of a predetermined qualitative model, sensor means for detecting an output of the object to be controlled, error sign detection means for detecting the sign of a difference between an aimed value and the detected value of the detecting means, an input-variation-vector selection circuit for selecting an input-variation-vector on the basis of the output of said error sign detection means and the predictive sign data, output sign detecting means for detecting a predetermined sign for representing variation of output value of the object to be controlled, input vector renewal means for adding the selected input-variation-vector to the input of said object to be controlled, and qualitative model correction means for correcting the qualitative model on the basis of the input of the object to be controlled and the output detected by the output sign detecting means.

According to the present invention, an input data applied to the apparatus to be controlled is determined on the basis of the data of which an input-variation-vector is calculated by a predetermined qualitative model, and in order to obtain closer output of the apparatus to be controlled to an expected value, the qualitative model is corrected. Hence, a preferable output is realizable by a comparatively small number of change of the input-variation-vector.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
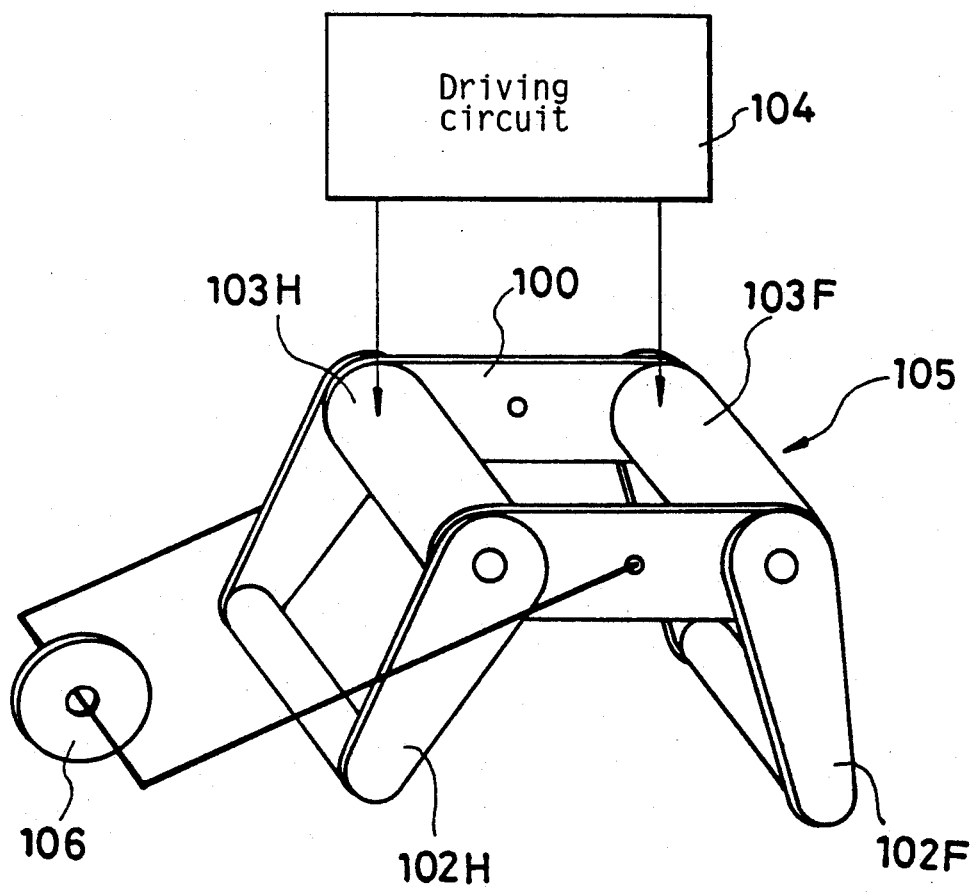
FIG. 1 is the perspective view of the walking robot in the prior art.
Figure 2A:
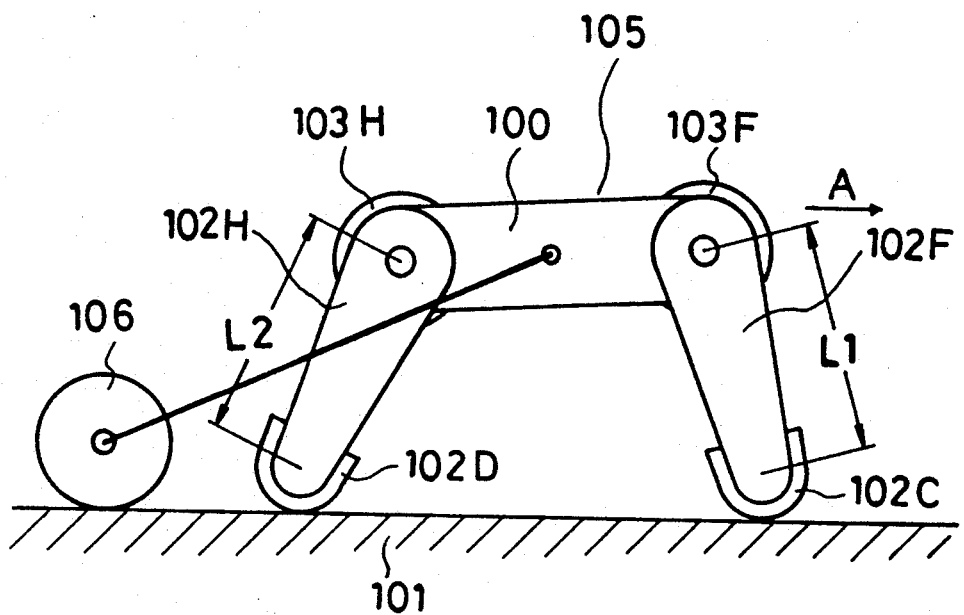
FIGS. 2(a) and 2(b) are side views of operation of the walking robot in an embodiment of the present invention.
Figure 2B:
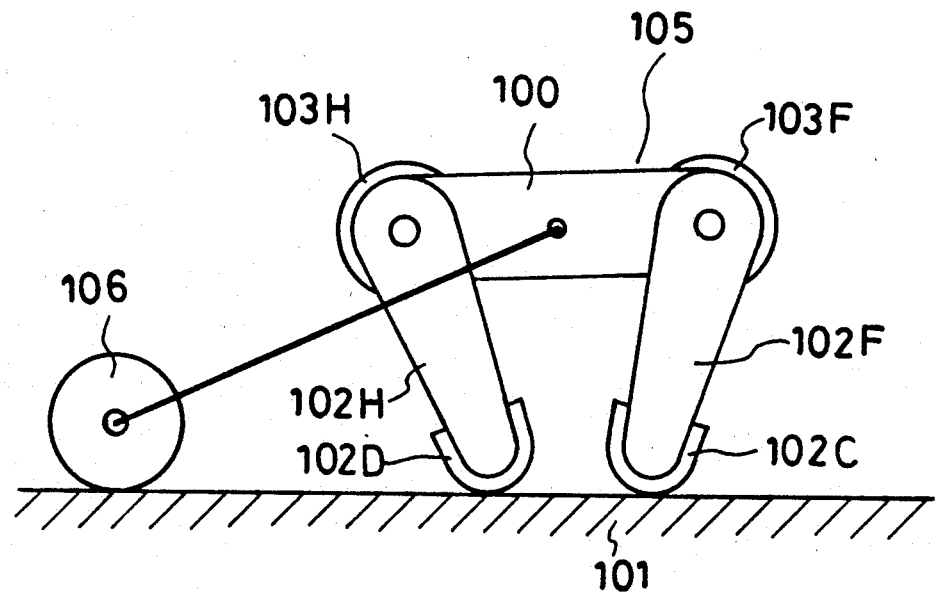

In the embodiment, the adaptive control system is applied to a walking robot 105 having a known mechanical configuration as shown in FIGS. 2(a) and 2(b). Referring to FIGS. 2(a) and 2(b), a body 100 of the walking robot 105 has a foreleg 102F and a hind leg 102H which are pivotally mounted thereto. The foreleg 102F is driven by a motor 103F, and the hind leg 102H is driven by a motor 103H. Coefficients of friction of both foots 102C and 102D which contact a floor 101 are different from each other. The walking robot 105 is provided with a distance sensor 106 for detecting a travel distance.

Operation of the above-mentioned walking robot 105 is elucidated hereafter. An input vector U which is applied to the walking robot 105 is given by a relation (2), $$U = (u1A, u1B, u2A, u2B) \quad (2).$$

where,
u1A: angle of foreleg before action,
u1B: angle of foreleg after action,
u2A: angle of hind leg before action,
u2B: angle of hind leg after action.

The input vector U is prepresented by a vector value, and the elements u1A, u1B, u2A and u2B are define by real numbers.

The foreleg 102F and hind leg 102H are driven by the motors 103F and 103H, respectively as shown in FIGS. 2(a) and 2(b). Consequently, in the event that the frictional forces of the foot 102C of the foreleg 102F and the foot 102D of the hind leg 102H against the floor 101 are different from each other, the walking robot 105 advances to the direction shown by arrow A.

In the walking operation of the walking robot 105, first, the walking robot 105 is operated from the status shown by FIG. 2(a) to the status shown by FIG. 2(b), second, it is operated to return again to the status shown in FIG. 2(a), and thereby one cycle of the walking action of the walking robot is completed. Therefore, the relation (2) represents half cycle of the action of the walking robot 105.

A travel distance (y) of one cycle of the walking action of the walking robot 105 shown in FIGS. 2(a) and 2(b) is represented by the relation (1) (y=g(U)) shown in the "Description of the prior art". The function g(U) of the relation (1) is varied by weight allocation on the foreleg 102F and the hind leg 102H of the walking robot 105, the ratio of the length L1 of the foreleg 102F to the length L2 of the hind leg 102H and coefficients of friction between the floor 101 and the feet 102C and 102D.

CONTROL CIRCUIT CONFIGURATION

Figure 3:
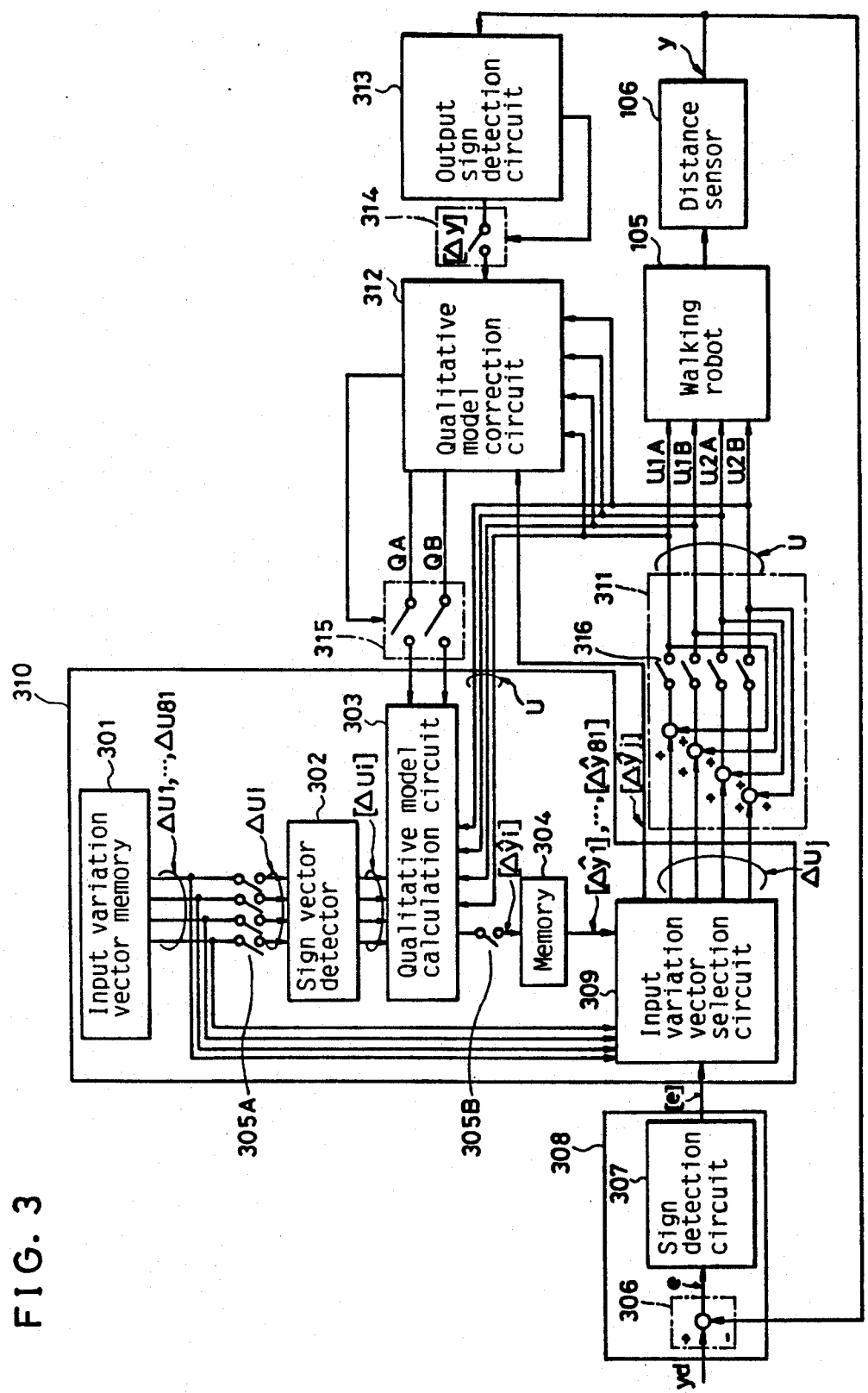
FIG. 3 is a circuit block diagram of a first embodiment of the adaptive control system in accordance with the present invention.

FIG. 3 is a circuit block diagram of a first embodiment of the adaptive control system in accordance with the present invention. Referring to FIG. 3, the adaptive control system of the first embodiment comprises an input-variation-vector determining circuit 310 for determining an input-variation-vector, an input vector renewal circuit 311 for renewing the input vector U which is inputted to the walking robot 105, an output variation sign detecting circuit 313 for detecting a sign which represents increase or decrease of variation of a travel distance of the walking robot 105 from the output of a distance sensor 106 (increase of variation is represented by "+" and decrease of variation is represented by "−"), a qualitative model correction circuit 312 and an error sign detection circuit 308.

The input-variation-vector determination circuit 310 comprises the following seven elements:

(1) Input-variation-vector memory 301:

Predetermined eighty-one input-variation-vectors $\Delta U1 \ldots \Delta U81$ are stored. The number of the input-variation-vector $\Delta Ui$ is evaluated by the method described in the "Description of the Related Art". The input-variation-vector $\Delta Ui$ comprises four data ($\Delta u1A$, $\Delta u1B$, $\Delta u2A$, $\Delta u2B$), and each data is either one of a positive value, a negative value or zero, for example ($\Delta u1A$, 0, 0, 0), or ($0 - \Delta u1B$, $\Delta u2A$, $\Delta u2B$). The positive value represents increase of an angle to a predetermined direction, and the negative value represents decrease of the angle thereto. "Zero" represents an unchanged angle.

The data $\Delta u1A$, $\Delta u1B$, $\Delta u2A$ and $\Delta u2B$ represent small angles which are added to rotating angles of the foreleg 102F and hind leg 102H, for example 2°. Each data can be set by a various angles, for example (2, −3, 0, 2).

(2) Switch 305A:

The switch 305A is closed to input the data of the input-variation-vector memory 301 to a sign vector detector 302.

(3) Sign vector detector 302:

An input-variation-vector $\Delta Ui$ is inputted to the sign vector detector 302 from the input-variation-vector memory 301, and a sign vector $[\Delta Ui]$ which represents sign (+, − or 0) of each data is output. Hereinafter, a letter put in parentheses [] represents sign "+", "−" or "0" of the data represented by the letter. For example, when an input-variation-vector $\Delta Ui$ (=0, $-\Delta u1B$, $\Delta u2A$, $\Delta u2B$) is inputted, a sign vector $[\Delta Ui]$ (=0, −, +, +) is output.

(4) Qualitative model calculation circuit 303:

The qualitative model calculation circuit 303 comprises a calculator for predicting a sign of the output "y" which represents a travel distance and a moving direction of the walking robot 105 on the basis of the sign vector [ΔUi] output from the sign vector detector 302. The calculation is performed in compliance with a predetermined qualitative model, and as a result, a predictive sign data [Δŷ i] is output. Hereinafter the "^" attached on a letter represents predictive data of the data represented by the letter. The predictive sign data [Δŷ i] represents a sign for representing a predictive variation direction of the output "y", and comprises one of increase prediction "+", decrease prediction "−", unchanged prediction "0" and impossibility of prediction "?".

(5) Switch 305B:

The switch 305B is connected between the sign vector detector 302 and a memory 304 and is closed to input the output data of the qualitative model calculation circuit 303 to a memory 304.

(6) Memory 304:

The predictive sign data [Δŷ i] output from the qualitative model calculation circuit 303 is memorized in the memory 304 through the switch 305B. In normal operation, eighty-one predictive sign data [Δŷ 1], [Δŷ 2] ... [Δŷ81] are memorized in the memory 304.

(7) Input-variation-vector selection circuit 309:

A predictive sign data [Δŷ i] from the memory 304 and an input-variation-vector ΔUi from the input-variation-vector memory 301 are inputted to the input-variation-vector selection circuit 309, and one predictive sign data [Δŷ j] which is coincident with a sign [e] of the value of an error inputted from an error sign detection circuit 308 (which is described hereafter) is selected from entire predictive sign data [Δŷ 1]-[Δŷ 81]. The selected predictive sign data [Δŷ j] is applied to the qualitative model correction circuit 312.

The adaptive control system further comprises an error sign detector circuit 308, an input vector renewal circuit 311 and a qualitative model correction circuit 312.

Error sign detection circuit 308:

The error sign detection circuit 308 has an error calculation circuit 306 for evaluating a difference between an aimed value "yd" and the detected value "y" of the distance sensor 106, and the error "e" calculated thereby is inputted to a sign detection circuit 307. Then a sign [e] of the value of the error "e" is detected by a sign detection circuit 307, and the sign [e] is inputted to the input-variation-vector selection circuit 309. The sign [e] has one of data of the signs "+", "−" and "0". Namely, the sign [e] has information to increase or to decrease the output "y" so that the output "y" approaches a desired output "yd", or to maintain the present output.

Input vector renewal circuit 311:

The input-variation-vector ΔUj output from the input-variation-vector selection circuit 309 is added to the present input U by the input vector renewal circuit 311, and a new input U is applied to the walking robot 105. A switch 316 is opened during the above-mentioned addition.

Figure 4:
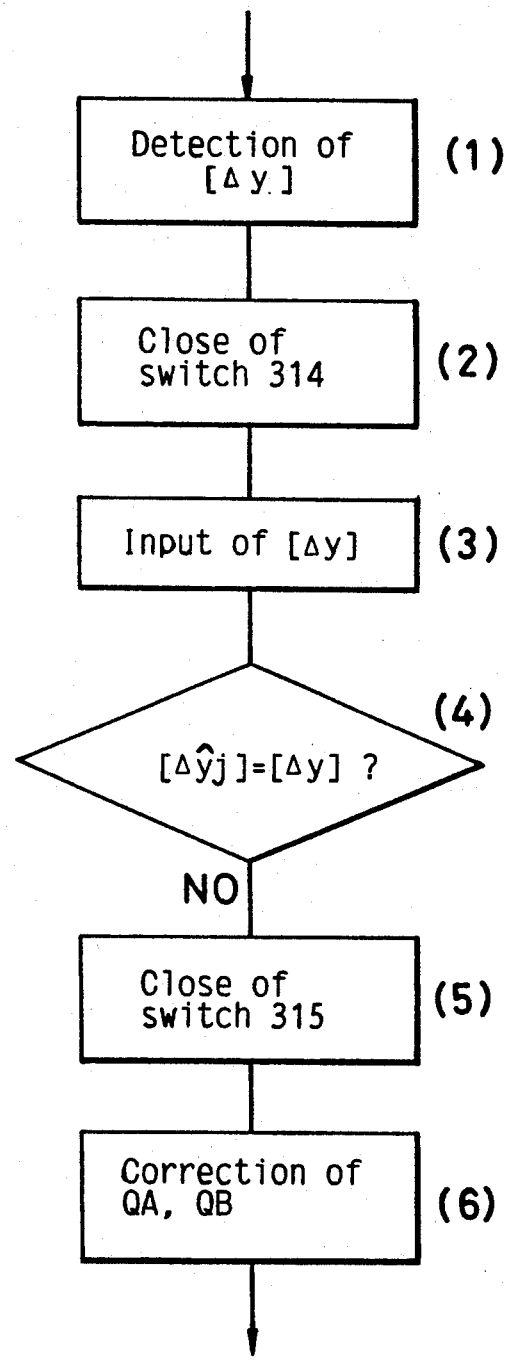
FIG. 4 is a flow chart of operation of a qualitative model correction circuit and an output sign detection circuit of the first embodiment.

Qualitative model correction circuit 312:

The input U and the predictive sign data [Δŷ i] are inputted to the qualitative model correction circuit 312. A sign variation vector [Δy] which represents variation of a travel distance is detected by the output sign detection circuit 313, and thereby, a switch 314 is closed (Steps 1 and 2 of the flow chart shown in FIG. 4). Then the sign variation vector [Δy] is inputted to the qualitative model correction circuit 312 (Step 3).

In the qualitative model correction circuit 312, the sign variation vector [Δy] is compared with the predictive sign data [Δŷ] (Step 4), and when both the sign variation vector [Δy] and the predictive sign data [Δŷ] are not equal, a switch 315 is closed. Consequently, correction outputs QA and QB are inputted to the qualitative model calculation circuit 303 (Steps 5 and 6), and thereby the qualitative model is corrected.

QUALITATIVE MODEL

The qualitative model is elucidated hereafter.

Figure 5:
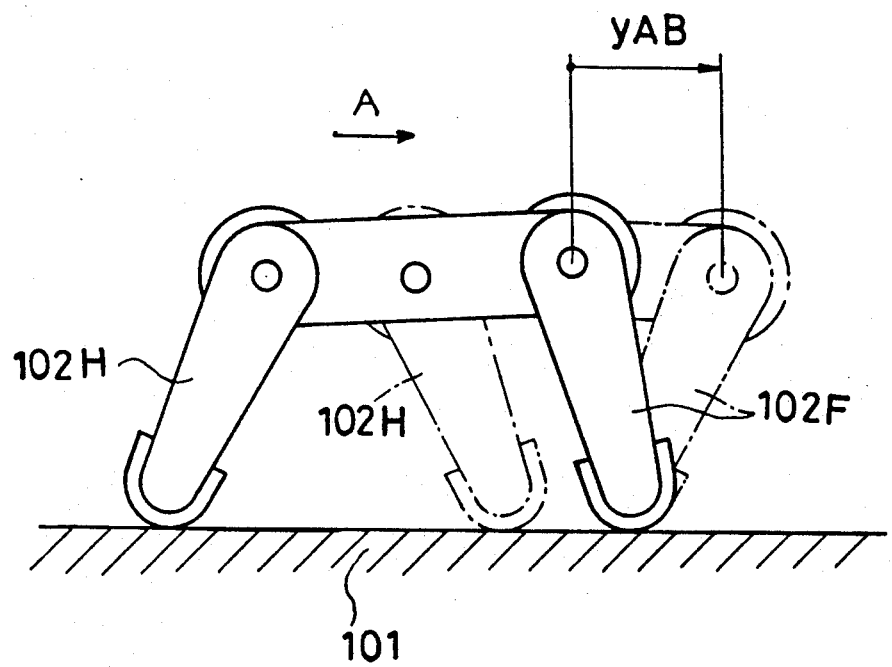
FIG. 5 is a side view of the walking robot in walking operation.

First, consideration is made for a situation when the walking robot is operated from a position which is opened between the foreleg 102F and hind leg 102H as shown in FIG. 2(a) to the position which is closed between the foreleg 102F and hind leg 102H as shown in FIG. 2(b). In the event that the friction of the foot 102C is larger than that of the foot 102D, the foot 102C does not slip on the walking plane 101, but only the foot 102D slips on the walking plane 101. Consequently, the walking robot travels a distance "yAB" as shown in FIG. 5. In the above-mentioned case, the larger the variation of angle (u1A−u1B) of the foreleg 102F is, the longer the travel distance "yAB" is. Therefore, the revolution angle of the hind leg 102H does not serve to the travel distance "yAB".

The travel distance "yAB" by the above-mentioned variation of the positions is given by relation (3), $$yAB = \begin{cases} g1(U1A - u1B), & F1A - F2A > 0 \\ 0, & F1A - F2A = 0 \\ g2(u2B - u2A), & F1A - F2A < 0 \end{cases} \quad (3)$$

where,
F1A: frictional force of foot 102C and
F2A: frictional force of foot 102D.

Since "g1" and "g2" are increasing functions, $g1(0)=g2(0)=0$.

Referring to relation (3), the sign of a value (F1A−F2A) must be determined to obtain the travel distance "yAB", but detection of the frictional forces F1A and F2A are very difficult. Accordingly, a relation which is equivalent to the representation (F1A−F2A) is made by using the input vector U (=u1A, u1B, u2A, u2B) which is a detectable angular data.

The equation (F1A−F2A=0) in the relation (3) represents that the frictional force of the foot 102C is equal to that of the foot 102D. It is now assumed that the length L1 of the foreleg 102F is equal to that of the hind leg 102H, and a frictional coefficient μ1 between the foreleg 102F and the walking plane 101 is equal to a frictional coefficient μ2 between the hind leg 102H and walking plane 101, then the equation (F1A−F2A=0) is equivalent to the equation (u1A−u2A=0). The above-mentioned equivalent relation is represented by the relation (4) in general.

$$\begin{aligned} F1A - F2A &> 0 \text{ is equivalent to } u2A - u1A - QA > 0 \\ F1A - F2A &= 0 \text{ is equivalent to } u2A - u1A - QA = 0 \\ F1A - F2A &< 0 \text{ is equivalent to } u2A - u1A - QA < 0 \end{aligned} \quad (4)$$

where, a boundary parameter QA is varied by the relations between L1 and L2 and between μ1 and μ2. Therefore, the representation (u1A−u2A−QA) is a boundary function which is composed of input data and boundary parameters, and the dimension thereof is identical with the input data. However, provided that L1=L2 and μ1=μ2, the boundary parameter QA equals zero.

The following relation (5) is obtained by combination of the relations (2) and (3).

$$yAB = \begin{cases} g1(u1A - u1B), & u2A - u1A - QA > 0 \\ 0, & u2A - u1A - QA = 0 \\ g2(u2B - u2A), & u2A - u1A - QA < 0 \end{cases} \quad (5)$$

In a similar manner, the travel distance "yBA" in operation of the walking robot from the position shown by FIG. 2(b) to the position shown by FIG. 2(a) is represented by the relation (6).

$$yBA = \begin{cases} -g1(u1A - u1B), & u2B - u1B - QB > 0 \\ 0, & u2B - u1B - QB = 0 \\ -g2(u2B - u2A), & u2B - u1B - QB < 0 \end{cases} \quad (6)$$

Moreover, in the event that, first, the position of the walking robot is changed from the position shown by FIG. 2(a) to the position shown by FIG. 2(b), and second the position is changed from the position shown by FIG. 2(b) to the position shown by FIG. 2(a), the travel distance y is given by $$y = yAB + yBA \quad (7)$$

These relations (4), (5) and (6) are listed in Table 1.

TABLE 1

| Region number | [u2A − u1A − QA] | [u2B − u1B − QB] | y |
|---|---|---|---|
| 1 | + | + | 0 |
| 2 | + | 0 | g1 (u1A − u1B) |
| 3 | + | − | g1 (u1A − u1B) − g2 (u2B − u2A) |
| 4 | 0 | + | −g1 (u1A − u1B) |
| 5 | 0 | 0 | 0 |
| 6 | 0 | − | −g2 (u2B − u2A) |
| 7 | − | + | −g1 (u1A − u1B) + g2 (u2B − u2A) |
| 8 | − | 0 | g2 (u2B − u2A) |
| 9 | − | − | 0 |

Referring to Table 1, region numbers (1-9) show regions which are divided by a sign of the difference value between the input vector U(=u1A, u1B, u2A, u2B) inputted to the robot and boundary parameter QA or QB. The region is divided into three kinds of regions depending on the sign of the difference value between the input value (u1A−u2A) and the boundary parameter QA as shown in the relation (5). Referring to the relation (6), the region is divided into three kinds of regions depending on the sign of the difference value between the input value (u2B−u1A) and the boundary parameter QB. Consequently, nine regions (3×3=9) are formed. The function for evaluating the travel distance "y" is different from each other in the respective regions.

Derivation of the sign of the value of a boundary function is as follows. For example, in the boundary function sign [u2A−u1A−QA] of the region number (1), the boundary function [u2A−u1A−QA] is larger than zero, and consequently, the boundary function sign is "+". In a similar manner, in the boundary function sign [u2B−u1B−QB] of the region number (2), the boundary function u2B−u1B−QB is equal to zero, and consequently, the boundary function sign is "0".

Derivation of the output value "y" in each boundary number is described below. "yAB" represents a travel distance of the walking robot 105 by positional change from the position shown in FIG. 2(a) to the position shown in FIG. 2(b), and "yBA" represents a travel distance thereof by positional change from the position shown in FIG. 2(b) to the position shown in FIG. 2(a).

In region number (1), yAB=g1(u1A−u1B) from relation (5), yBA=−g1(u1A−u1B) from relation (6), and consequently, a traveling distance "y" is given by $$y = yAB + yBA = 0 \quad (8).$$

On the other hand, in region number (2), yAB=g1(u1A−u1B) from relation (5), yBA=0 from relation (6), and consequently, a traveling distance "y" is given by $$y = yAB + yBA = g1(u1A - u1B) \quad (9).$$

Since the functions g1 and g2 are an increase function, the sign of the output value is predictable from the sign of the value of an input vector. The "production of sign" is performed on the basis of a "qualitative model" set in the qualitative model calculation circuit 303. Table 2 represents the "qualitative model". On the table 2, the predictive sign data [Δŷ] corresponding to the combination of the signs of the boundary function signs [u2A−u1A−QA] and [u2B−u1B−QB] are listed.

TABLE 2

| Region number | [u2A − u1A − QA] | [u2B − u1B − QB] | [Δŷ] |
|---|---|---|---|
| 1 | + | + | 0 |
| 2 | + | 0 | +[Δu1A] − [Δu1B] |
| 3 | + | − | +[Δu1A] − [Δu1B] + [Δ2A] − [Δu2B] |
| 4 | 0 | + | −[Δ1A] + [Δu1B] |
| 5 | 0 | 0 | 0 |
| 6 | 0 | − | +[Δu2A] − [Δu2B] |
| 7 | − | + | −[Δu1A] + [Δu1B] − [Δu2A] + [Δu2B] |
| 8 | − | 0 | −[Δu2A] + [Δu2B] |
| 9 | − | − | 0 |

Referring to Table 2, the predictive sign data [Δŷ] is derived as follows.

For example, in the region number (1), the predictive sign data [Δŷi] is equal to "0" ([Δŷi]=0) with respect to a sign vector [ΔUi] (=(+, 0, −, +)). Namely, the predictive sign data [Δŷi] is equal to zero in any value of the sign vector [ΔUi].

In region number (2), the predictive sign data [Δŷ] is "+" with respect to the sign vector [ΔUi] (=(+, −, −, +)) as below,

[Δŷi]=+[Δu1A]−[Δu1B]=("+"−"−")→"+".

Besides, for example, referring to a sign vector [ΔUi]=(+, +, −, +), the predictive sign data [Δŷi] has no fixed sign as below, $$[\Delta \hat{y}i] = +[\Delta u1A] - [\Delta u1B] = "+" - "+" \rightarrow "?".$$

The output of the qualitative model correction circuit 312 includes boundary parameters QA and QB which are determined by the friction coefficients $\mu 1$ and $\mu 2$ and the length of foreleg 102F and the length of hind leg 102H. The friction coefficients $\mu 1$ and $\mu 2$ are data which are difficult to measure and are impossible to predict. Consequently, the boundary parameters QA and QB including the friction coefficients $\mu 1$ and $\mu 2$ can not be correctly predicted, and the prediction in the Table 2 is not always correct. In the event that the prediction is not correct, the sign data $[\Delta y]$ of the actual output value detected by the output sign detection circuit 313 does not coincide with the predictive sign data $[\Delta \hat{y}]$ which is output from the input vector selection circuit 309. In the above-mentioned case, it seems that the qualitative model which is used in the qualitative model calculation circuit 303 is inadequate, and thus the boundary parameters QA and QB of the qualitative model are modified.

An example of the operation of modification which are applied with an actual values is described hereafter. An input of the walking robot is given by $$\begin{aligned} Ui &= (u1A, u1B, u2A, u2B) \\ &= (-20°, 10°, 40°, 20°), \end{aligned} \quad (10)$$

and by assuming that QA=20° and QB=10°, the relation (11) is derived from relation (5) as follows:

$$\begin{aligned}[] [u2A - u1A - QA] &= [40 - (-20) - 20] \\ &= [40] = "+". \end{aligned} \quad (11)$$

Also, from relation (6), the result is obtained as follows:

$$\begin{aligned}[] [u2B - u1B - QB] &= [20 - 10 - 10] \\ &= [0] = "0". \end{aligned} \quad (12)$$

Region number (2) of Table 2 is selected from the above-mentioned calculation results (11) and (12).

In this status, the following input-variation-vector $\Delta ui$ is $$\begin{aligned} \Delta Ui &= (+\Delta u1A, -\Delta u1B, 0, \Delta u2B) \\ &= (+2°, -2°, 0, +2°). \end{aligned} \quad (13)$$

Predictive sign data $[\Delta \hat{y}]$ is calculated by the Table 2 as follows:

$$\begin{aligned}[] [\Delta \hat{y}] &= +[\Delta u1A] - [\Delta u1B] \\ &= +[+2] - [-2] \\ &= "+" - "-" \\ &= "+". \end{aligned} \quad (14)$$

After completion of walking action of the walking robot which is given the above-mentioned input-variation-vector, a sign data $[\Delta y]$ is derived by the output sign detection circuit 313. When the sign data $[\Delta y]$ is "−", it seems that selection of the region number is inadequate. Then, the region number which is "−" in a predictive sign data $[\Delta \hat{y}]$ is searched in the Table 2. And the region number (4) is found to be adequate by the calculation (12). Accordingly, in the data of relations (10) and (13), boundary parameters QA and QB, which are consistent with the boundary function of the region number (4), are calculated from relations (5) and (6), and hence relations (15) are derived.

$$[u2A - u1A - QA] = [40 - (-20) - QA'] = "0" \quad (15)$$

$$[u2B - u1B - QB] = [20 - 10 - QB'] = "+" > 0.$$

In the above-mentioned relations (15), values of boundary parameters QA' and QB' which fulfill the relations (15) are calculated as follows:

$$QA' = 40 - (-20) = 60 \quad (16)$$

$$QB' = 20 - 10 - \epsilon = 10 - \epsilon.$$

The value "$\epsilon$" is a relatively small positive real number.

On the contrary, in the event that the sign data $[\Delta y]$ is "+", a predictive sign data $[\Delta \hat{y}]$ is equal to the sign data $[\Delta y]$ ($[\Delta \hat{y}]=[\Delta y]$). Consequently, the boundary parameters QA and QB are not changed.

Figure 6:
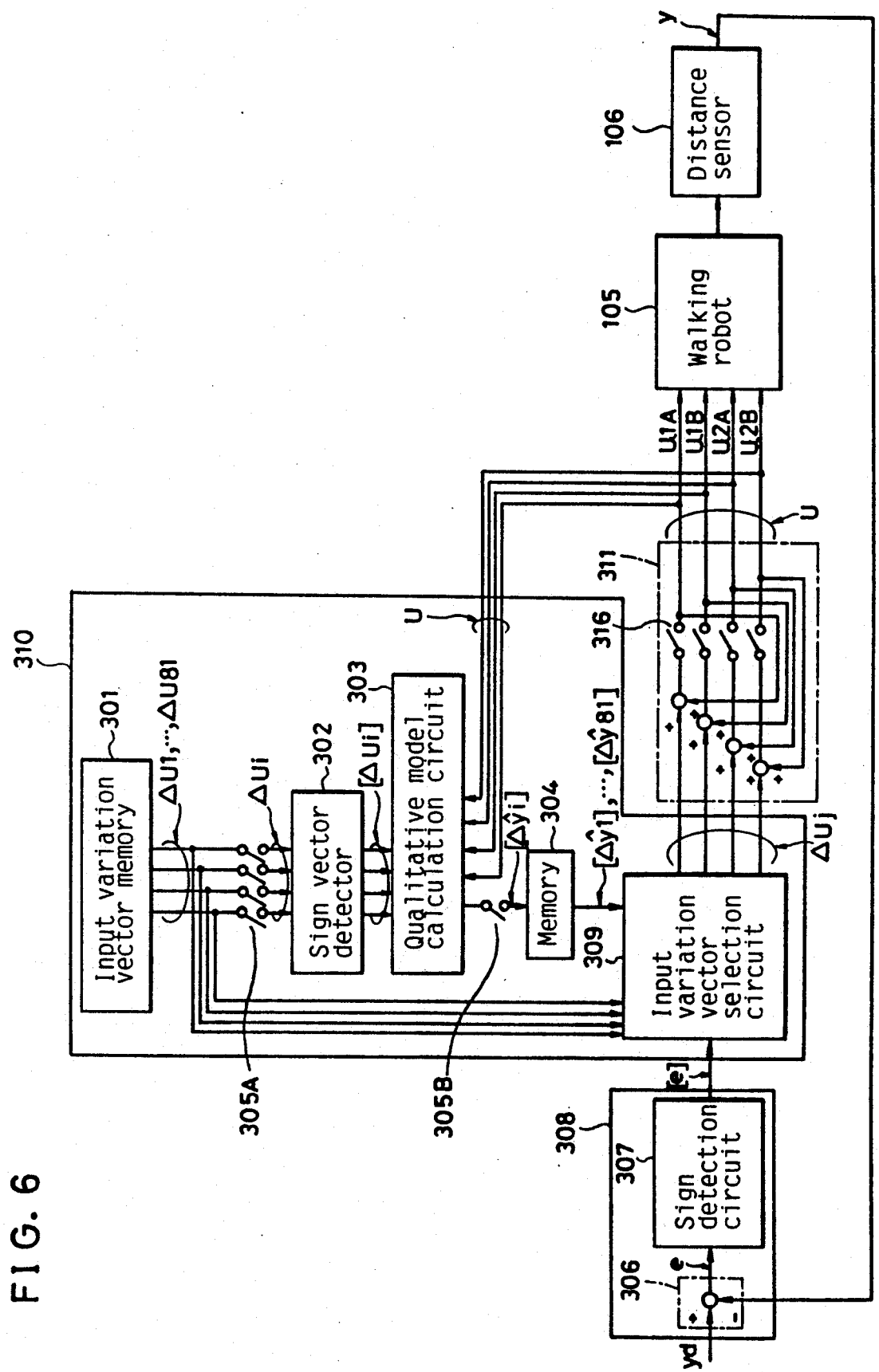
FIG. 6 is a circuit block diagram of a second embodiment of the adaptive control system in accordance with the present invention.

In the event that the friction coefficient $\mu 1$ is equal to the friction coefficient $\mu 2$ ($\mu 1=\mu 2$) and the length L1 of the foreleg is equal to the length L2 of the hind leg (L1=L2), the boundary parameters QA and QB are zero. Therefore, correction of the qualitative model is not performed. In this particular case, a second embodiment of the adaptive control system shown in FIG. 6 is applicable. In the circuit block diagram shown by FIG. 6, the qualitative model correction circuit 312, output variation sign detection circuit 313 and switches 314 and 315 shown in FIG. 3 are omitted.

According to the present invention, since the input data which is applied to the object to be controlled, such a walking robot, is determined on the basis of the qualitative model, the resultant output in operation of the object coincides with a target output by a relatively small number of trials, for example 30~100 of trials. Moreover, according to the embodiment of the present invention in which the qualitative model is corrected by the qualitative model correction circuit 312, the resultant output in operation of the object coincides with the target output by a few number of trails, for example 10~20 of trails.

The above-mentioned first and second embodiments are the cases applied to the walking robot in the description, but the adaptive control system in accordance with the present invention is applicable to, a chemical plant or the like.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An adaptive control system comprising:
   input-variation-vector generating means for generating a plurality of input-variation-vectors for varying input applied to an object to be controlled,
   qualitative model calculation means for outputting predictive sign data by applying calculation to said input-variation-vector on the basis of a predetermined qualitative model, sensor means for detecting an output of said object to be controlled, error sign detection means for detecting the sign of a difference between an aimed value and the detected value of said detecting means, an input-variation-vector selection circuit for selecting an input-variation-vector on the basis of the output of said error sign detection means and said predictive sign data, output sign detecting means for detecting a predetermined sign for representing variation of output value of said object to be controlled, input vector renewal means for adding said selected input-variation-vector to said input of said object to be controlled, and qualitative model correction means for correcting said qualitative model on the basis of said input of said object to be controlled and said output detected by said output sign detecting means.

2. An adaptive control system in accordance with claim 1, wherein said qualitative model calculation means comprises a qualitative model represented by at least one qualitative equation, which corresponds to
- a boundary function having an input vector and at least one boundary parameter and
- the sign of a value which is evaluated by substituting said input vector for said boundary function.

3. An adaptive control system in accordance with claim 2, wherein
said qualitative model correction means comprises means for changing said boundary parameter.

4. An adaptive control system comprising:

input-variation-vector generating means for generating a plurality of input-variation-vectors for varying input applied to an object to be controlled, qualitative model calculation means for outputting predictive sign data by applying calculation to said input-variation-vector based on a predetermined qualitative model represented by at least one qualitative equation, which corresponds to a boundary function having an input vector and at least one boundary parameter and the sign of a value which is evaluated by substituting said input vector for said boundary function, sensor means for detecting an output of said object to be controlled, error sign detection means for detecting the sign of a reference value between an aimed value and the detected value of said detecting means, an input-variation-vector on the basis of the output of said error sign detection means and said predictive sign data, and input vector renewal means for addiing said selected input-variation-vector to said input of said object to be controlled.

* * * * *